M. W. Lyman,
Cage Trap.
No. 100,779. Patented Mar. 15, 1870.
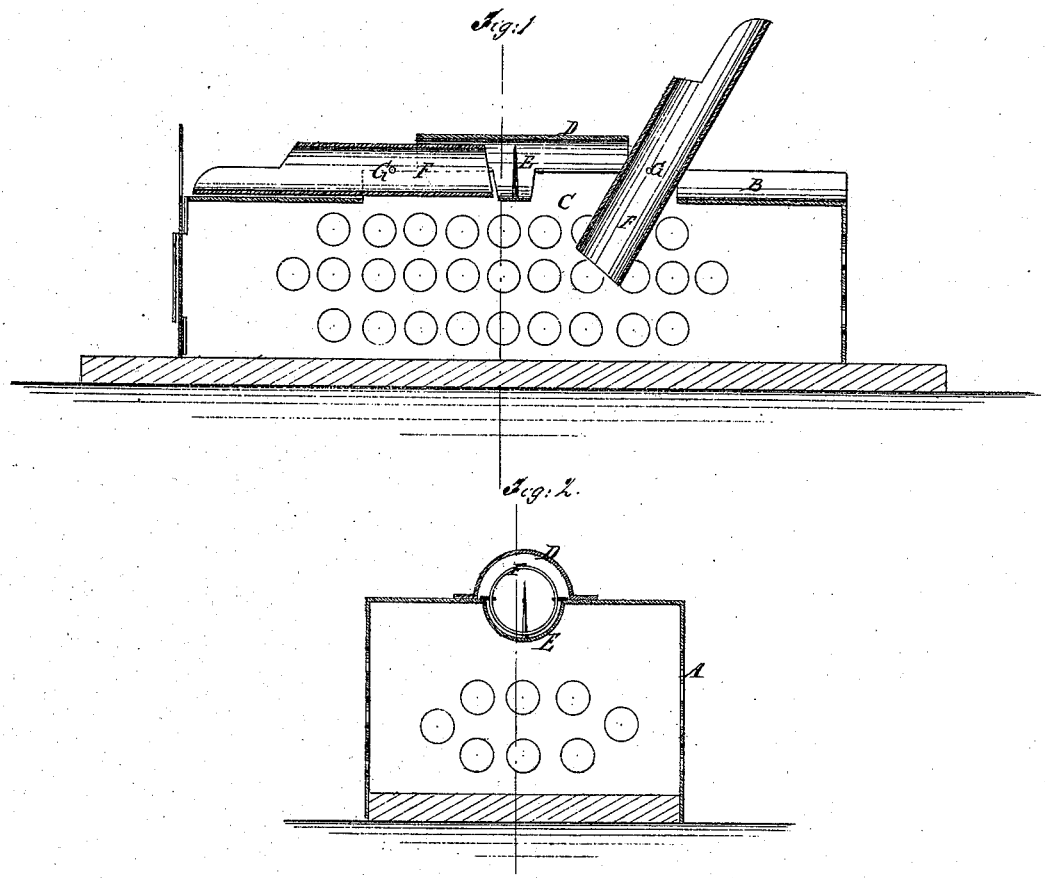

United States Patent Office.

MYRON W. LYMAN, OF CHICAGO, ILLINOIS.

Letters Patent No. 100,779, dated March 15, 1870.

IMPROVED ANIMAL-TRAP.

The Schedule referred to in these Letters Patent and making part of the same.

*To all whom it may concern:*

Be it known that I, MYRON W. LYMAN, of Chicago, in the county of Cook, and State of Illinois, have invented a new and improved Animal-Trap; and I do hereby declare that the following is a full, clear, and exact description thereof, which will enable others skilled in the art to make and use the same, reference being had to the accompanying drawings forming part of this specification.

This invention relates to improvements in animal-traps, and consists in the arrangement on the top of a cage, preferably in a groove therein, of one or more pivoted tilting cylinders, leading under an arched cover to a place where the bait is secured, so as to entice the animals into the said cylinders and to the unsupported ends, which will be caused, by the weight of the animals, to tilt down and deliver them into the cage, from which escape is prevented by the return of the cylinders.

Figure 1 is a longitudinal section of my improved trap, and

Figure 2 is a transverse section of the same.

A is a cage of perforated sheet metal, or other articulated substance, having a large groove, B in the top, with a long slot cut in the central part leading into the cage.

This slot is covered for the most part by an arched shaped cover, D, over the central part, and protecting a bait-support, E, between the tilting ends of the cylinders F of sheet metal arranged in the grooves on pivots G, so as to afford apparent admission to the bait, but so placed over the slot C that when the animals approaching the bait pass beyond the pivots, they will tilt downward and deliver them into the cage below; and as soon as they are delivered of the weight of the animals they will be tilted back by the preponderating weight of the outer ends, and be reset for other animals.

I may use only one tube, or two, as preferred, and two other tubes placed at right angles to these, converging toward the bait-support, may also be used, a protecting-cap or arch, D, being provided on them also, converging with the center of the cap D.

Having thus described my invention,

I claim as new and desire to secure by Letters Patent—

The combination, with a case, A, and a bait-support, E, of one or more tilting cylinders F, arranged in slots in the top of the case under a cap, D, and either in grooves or depressions in the top, or not, all substantially as specified.

MYRON W. LYMAN.

Witnesses:
    CHAS. E. TOWNE,
    JOHN F. MOKATE.